(12) United States Patent
Kuwajima

(10) Patent No.: US 8,730,774 B2
(45) Date of Patent: May 20, 2014

(54) OPTICAL DISK DEVICE AND OPTICAL DISK DEVICE ADJUSTING METHOD

(71) Applicant: Funai Electric Co., Ltd., Osaka (JP)

(72) Inventor: Mamoru Kuwajima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/853,725

(22) Filed: Mar. 29, 2013

(65) Prior Publication Data

US 2013/0272106 A1    Oct. 17, 2013

(30) Foreign Application Priority Data

Apr. 16, 2012   (JP) .................................. 2012-093316

(51) Int. Cl.
*G11B 7/00*        (2006.01)
(52) U.S. Cl.
USPC ..................................... 369/44.32; 369/44.29
(58) Field of Classification Search
None
See application file for complete search history.

(56) References Cited

U.S. PATENT DOCUMENTS

| | | | |
|---|---|---|---|
| 2001/0002893 A1* | 6/2001 | Ohshita et al. | 369/44.28 |
| 2001/0030915 A1* | 10/2001 | Suzuki | 369/44.29 |
| 2003/0039184 A1* | 2/2003 | Hirashima et al. | 369/44.25 |
| 2004/0105359 A1* | 6/2004 | Takagi | 369/44.32 |
| 2004/0223433 A1* | 11/2004 | Yamada et al. | 369/53.35 |
| 2005/0068872 A1* | 3/2005 | Kim et al. | 369/53.2 |
| 2005/0094508 A1* | 5/2005 | Seo | 369/44.29 |
| 2007/0206458 A1* | 9/2007 | Takeda | 369/44.29 |
| 2008/0144461 A1* | 6/2008 | Shimizu et al. | 369/53.17 |
| 2009/0109818 A1* | 4/2009 | Sehara et al. | 369/53.17 |
| 2010/0195457 A1* | 8/2010 | Asano et al. | 369/44.32 |

FOREIGN PATENT DOCUMENTS

JP    2005-158234 A    6/2005

\* cited by examiner

*Primary Examiner* — Thang Tran
(74) *Attorney, Agent, or Firm* — Global IP Counselors, LLP

(57) ABSTRACT

An optical disk device includes an optical pickup, and a controller. The optical pickup emits light on an optical disk, and detects return light from the optical disk. The controller performs a focus control based on a focus error signal corresponding to the return light detected by the optical pickup, and performs a tracking control based on a tracking error signal corresponding to the return light detected by the optical pickup. The controller finds a relation of an amount of deviation in a tracking balance of the tracking error signal relative to a change in a focus balance of the focus error signal while the tracking control is stopped prior to reproduction of the optical disk. The controller corrects the deviation in the tracking balance attributable to the change in the focus balance based on the relation while the focus balance is adjusted.

12 Claims, 9 Drawing Sheets

OPTICAL DISK DEVICE AND OPTICAL DISK DEVICE ADJUSTING METHOD

CROSS-REFERENCE TO RELATED APPLICATIONS

This application claims priority to Japanese Patent Application No. 2012-093316 filed on Apr. 16, 2012. The entire disclosure of Japanese Patent Application No. 2012-093316 is hereby incorporated herein by reference.

BACKGROUND

1. Field of the Invention

The present invention generally relates to an optical disk device and to an optical disk device adjusting method. More specifically, the present invention relates to an optical disk device performing focus control and tracking control during reproduction, and to an optical disk device adjusting method.

2. Background Information

Optical disk devices performing focus control and tracking control during reproduction are conventionally known (see Japanese Laid-Open Patent Application Publication 2005-158234 (Patent Citation 1), for example).

With the Patent Citation 1, a recording and reproduction device (e.g., an optical disk device) is configured such that a focus balance of a focus error signal is changed a specific number of times prior to reproduction, thereby adjusting the focus balance so as to achieve the maximum level of a tracking error signal.

SUMMARY

It has been discovered that, with the recording and reproduction device in Patent Citation 1, the tracking balance will deviate as the focus balance changes during the adjustment of the focus balance if there is fluctuation in the tracking balance attributable to a change in the focus balance. It has also been discovered that if this happens, the tracking control will be carried out in a state in which the tracking balance has deviated during reproduction, which is a problem because the tracking control may be unstable.

On object of the present disclosure is to provide an optical disk device with which tracking control can be kept from becoming unstable during reproduction even when there is fluctuation in a tracking balance attributable to a change in focus balance.

In view of the state of the know technology, an optical disk device includes an optical pickup, and a controller. The optical pickup is configured to emit light on an optical disk, and detect return light from the optical disk. The controller is configured to perform a focus control based on a focus error signal corresponding to the return light detected by the optical pickup, and perform a tracking control based on a tracking error signal corresponding to the return light detected by the optical pickup. The controller is further configured to find a relation of an amount of deviation in a tracking balance of the tracking error signal relative to a change in a focus balance of the focus error signal while the tracking control is stopped prior to reproduction of the optical disk. The controller is further configured to correct the deviation in the tracking balance attributable to the change in the focus balance based on the relation while the focus balance is adjusted.

Other objects, features, aspects and advantages of the present disclosure will become apparent to those skilled in the art from the following detailed description, which, taken in conjunction with the annexed drawings, discloses a preferred embodiment of an optical disk device.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
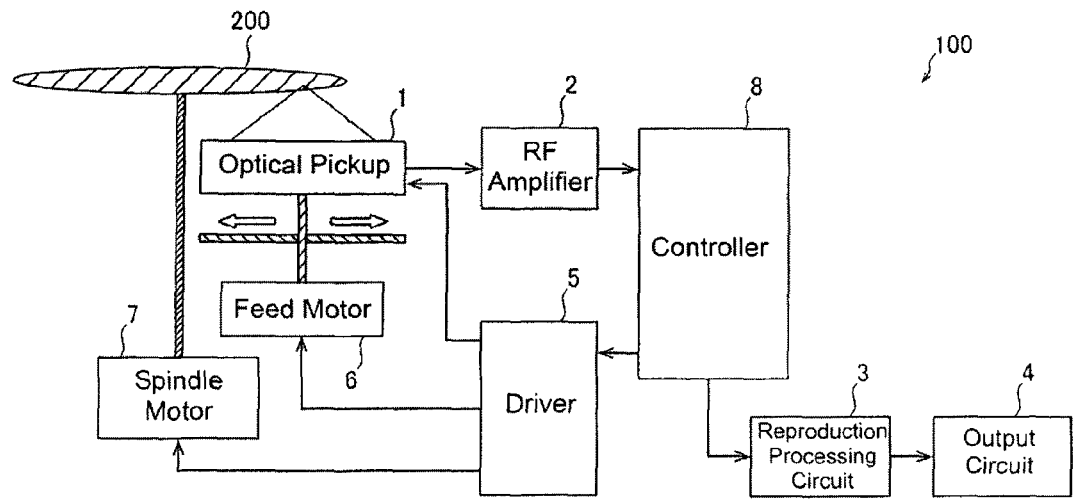
FIG. 1 is a simplified block diagram of an overall configuration of an optical disk device in accordance with one embodiment.

Referring initially to FIG. 1, a configuration of an optical disk device 100 is illustrated in accordance with one embodiment.

The optical disk device 100 pertaining to this embodiment is capable of reproducing a CD (compact disk), DVD (digital versatile disk), or BD (Blu-ray Disc®) as an optical disk 200. More specifically, the optical disk device 100 includes an optical pickup 1, an RF amplifier 2, a reproduction processing circuit 3, and an output circuit 4. The optical disk device 100 is further provided with a driver 5, a feed motor 6, a spindle motor 7, and a controller 8.

The optical pickup 1 has the function of reading various kinds of information (e.g., audio information, video information, etc.) recorded to the optical disk 200 by emitting a laser beam (e.g., a light beam) at the optical disk 200 and detecting return light from the optical disk 200. The optical pickup 1 is also able to emit an infrared laser beam with a wavelength of 780 nm, a red laser beam with a wavelength of 650 nm, and a blue laser beam with a wavelength of 405 nm for CD, DVD, and BD use, respectively. The configuration of the optical pickup 1 will be discussed in detail below.

The RF, amplifier 2 has the function of amplifying signals based on various kinds of information read by the optical pickup 1. The reproduction processing circuit 3 acquires the signals amplified by the RF amplifier 2 via the controller 8, and subjects these signals to various kinds of processing for reproduction (such as image processing). The output circuit 4 subjects the signals that have undergone processing by the reproduction processing circuit 3 to D/A conversion processing in order to output video and audio recorded to the optical disk 200 on a monitor and from a speaker (not shown), respectively.

The driver 5 controls the operation of the feed motor 6 and the spindle motor 7 based on instructions from the controller 8. The driver 5 also controls the operation of an actuator 21 and a BEX (beam expander) motor 22 (discussed below; see FIG. 2) provided inside the optical pickup 1, based on instructions from the controller 8. The feed motor 6 has the function of moving the optical pickup 1 in the radial direction of the optical disk 200. The spindle motor 7 has the function of rotating the optical disk 200.

The controller 8 produces focus error (FE) signals and tracking error (TE) signals based on the signals outputted from a light detector 20 (discussed below; see FIG. 2) provided inside the optical pickup 1. The controller 8 also performs focus servo control based on FE signals and performs tracking servo control based on TE signals during reproduction of the optical disk 200. The controller 8 also adjusts tracking balance (TBAL), focus balance (FBAL), and spherical aberration of the optical pickup 1 at least prior to reproduction of the optical disk 200. The phrase "prior to reproduction of the optical disk 200" refers to a point before the optical disk 200 is reproduced, such as immediately after the optical disk 200 is inserted into the optical disk device 100. The controller 8 is also able to adjust the tracking balance, the focus balance, and the spherical aberration at a specific timing based on a change in the ambient temperature of the optical disk device 100, not just prior to reproduction, but also after reproduction has started. Focus servo control and tracking servo control can be carried out stably and accurately during reproduction by adjusting the TBAL, the FBAL, and the spherical aberration. The processing for adjusting the focus balance and the spherical aberration will be discussed below.

Next, the configuration of the optical pickup 1 of the optical disk device 100 in this embodiment will be described in detail through reference to FIGS. 2 to 5.

Figure 2:
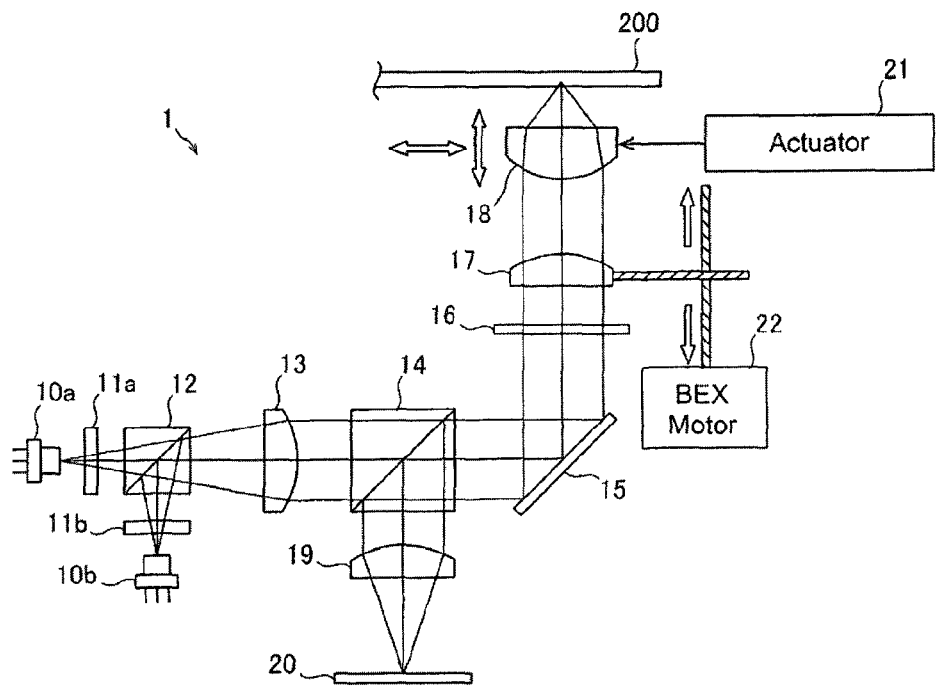
FIG. 2 is a simplified diagram of an optical pickup of the optical disk device illustrated in FIG. 1.

As shown in FIG. 2, the optical pickup 1 includes a first light source 10a, a second light source 10b, a first grating 11a, a second grating 11b, a dichroic prism 12, a collimator lens 13, a beam splitter 14, a mirror 15, a quarter wavelength plate 16, a collimator lens 17, an object lens 18, a detecting lens 19, the light detector 20, the actuator 21, and the BEX motor 22.

The first light source 10a has a two-wavelength integrated laser device capable of emitting an infrared laser beam with a wavelength of 780 nm for CD use, and a red laser beam with a wavelength of 650 nm for DVD use. The second light source 10b has a laser device capable of emitting a blue laser beam with a wavelength of 405 nm for BD use.

The first grating 11a is provided in order to diffract the laser beam emitted from the first light source 10a. The second grating 11b is provided in order to diffract the laser beam emitted from the second light source 10b. The dichroic prism 12 transmits light diffracted by the first grating 11a, and reflects light diffracted by the second grating 11b. The dichroic prism 12 aligns the optical axes of the diffracted light arriving from the first grating 11a and the second grating 11b.

The collimator lens 13 has the function of converting a laser beam arriving from the dichroic prism 12 into parallel light. The beam splitter 14 functions as a light separating element that separates an incident laser beam. The beam splitter 14 transmits the laser beam arriving from the collimator lens 13 to the mirror 15, and reflects light reflected by the optical disk 200 and arriving from the mirror 15 to the light detector 20.

The mirror 15 reflects the laser beam arriving from the beam splitter 14 to the optical disk 200, and reflects light reflected by the optical disk 200 and arriving from the optical disk 200 to the beam splitter 14. The mirror 15 is provided at a 45-degree angle to the optical axis of the laser beam arriving from the beam splitter 14, and reflects the laser beam arriving from the beam splitter 14 in a direction that is substantially perpendicular to the recording surface of the optical disk 200.

The quarter wavelength plate 16 has the function of converting linear polarized light into circular polarized light and converting circular polarized light into linear polarized light. Furthermore, the quarter wavelength plate 16 has the function of converting the laser beam of linear polarized light arriving from the mirror 15 into circular polarized light, and guiding the light to the collimator lens 17, and of converting the laser beam of circular polarized light reflected by the optical disk 200 into linear polarized light and guiding this light to the mirror 15.

The collimator lens 17 is movable by the BEX motor 22 in the optical axis direction (e.g., a direction perpendicular to the recording surface of the optical disk 200). When the collimator lens 17 moves in the optical axis direction, the result is that the laser beam transmitted by the collimator lens 17 becomes scattered light or focused light. This adjusts the spherical aberration of the optical pickup 1.

The object lens 18 has the function of converging the laser beam arriving from the collimator lens 17 on the recording surface of the optical disk 200. The object lens 18 is movable by the actuator 21 in the radial direction of the optical disk 200 and in a direction perpendicular to the recording surface of the optical disk 200, and its position is moved by the focus servo control and the tracking servo control.

The light reflected by the optical disk 200 reaches the detecting lens 19 via the object lens 18, the collimator lens 17, the quarter wavelength plate 16, the mirror 15, and the beam splitter 14. The detecting lens 19 then converges the light reflected by the optical disk 200 on a light receiving element provided on the light detector 20.

Figure 3:
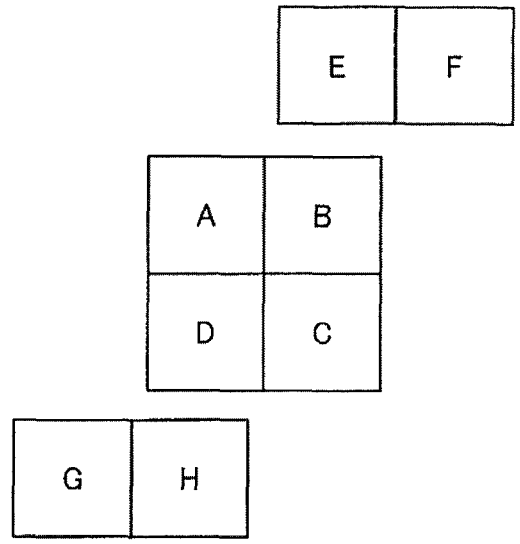
FIG. 3 is a simplified diagram of light receiving regions of a light detector of the optical disk device illustrated in FIG. 1.

The light detector 20 has the function of converting optical information received using a photodiode or other such light receiving element into an electrical signal, and outputting this electrical signal to the controller 8 (see FIG. 1). As shown in FIG. 3, the light detector 20 includes main light receiving regions A to D that are equally divided in four in the longitudinal and lateral directions, sub light receiving regions E and F that are equally divided in two in the lateral direction, and sub light receiving regions G and H that are equally divided in two in the lateral direction. The light detector 20 subjects each region individually to opto-electrical conversion and outputs the resulting electrical signal. The main light receiving regions A to D are regions for receiving $0^{th}$ order diffracted light (e.g., main beams), and the sub light receiving regions E to H are regions for receiving $1^{st}$ order diffracted light (e.g., sub beams).

The actuator 21 moves the object lens 18 in the radial direction of the optical disk 200 based on an object lens drive signal produced by the driver 5 (see FIG. 1). Consequently, a tracking operation is executed. The actuator 21 also moves the object lens 18 in a direction perpendicular to the recording surface of the optical disk 200 based on the object lens drive signal produced by the driver 5. Consequently, a focus operation is executed.

Figure 4:
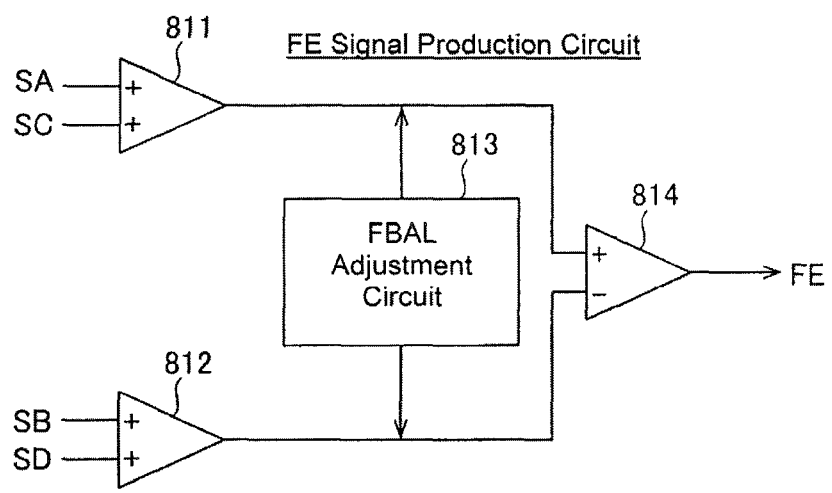
FIG. 4 is a simplified diagram of an FE signal production circuit of the optical disk device illustrated in FIG. 1.

The electrical signal outputted from the light detector 20 to the controller 8 is used to produce the focus error (FE) signals and the tracking error (TE) signals. The controller 8 produces the FE signals and the TE signals by performing computation processing using the electrical signals from the light detector 20. More specifically, as shown in FIG. 4, the controller 8 has a focus error (FE) signal production circuit. The FE signal production circuit produces the FE signals from electrical signals SA to SD corresponding to the regions A to D, respectively. More specifically, the FE signal production circuit is provided with summing amplifiers 811 and 812, an FBAL adjustment circuit 813, and a combination differential amplifier 814.

The summing amplifier 811 sums the electrical signals SA and SC. The summing amplifier 812 sums the electrical signals SB and SD. The FBAL adjustment circuit 813 multiplies the signal outputted from the summing amplifier 811 by a first FBAL coefficient, and multiplies the signal outputted from the summing amplifier 812 by a second FBAL coefficient. The output signal of the summing amplifier 811 by which the first FBAL coefficient has been multiplied is supplied to a non-inverting input terminal of the combination differential amplifier 814, and the output signal of the summing amplifier 812 by which the second FBAL coefficient has been multiplied is supplied to an inverting input terminal of the combination differential amplifier 814.

The combination differential amplifier 814 produces the FE signal based on the signals from the summing amplifiers 811 and 812. The balance value of the FE signal (FBAL value), which is an index indicating the amplitude balance of the FE signal, is calculated by the controller 8 (see FIG. 1). The controller 8 controls the FBAL adjustment circuit 813 to change the FBAL adjustment value (e.g., the ratio of the second FBAL coefficient to the first FBAL coefficient), and thereby adjusts the FBAL.

Figure 5:
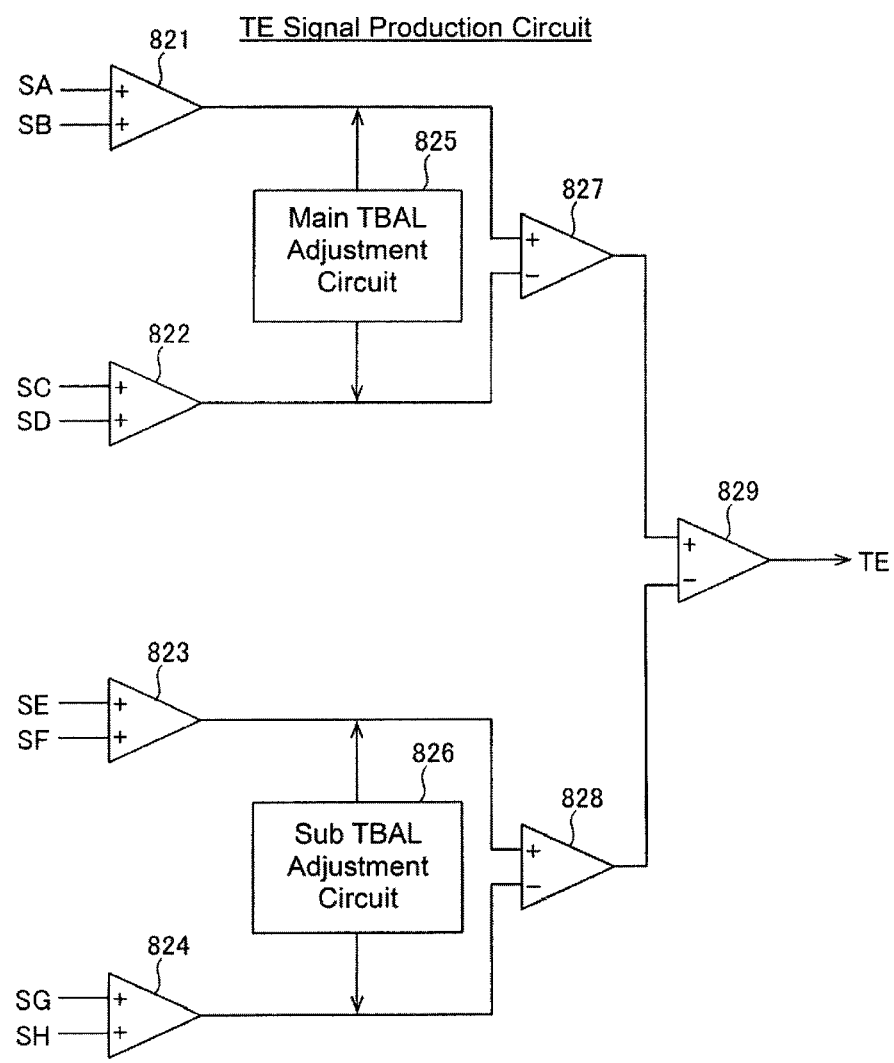
FIG. 5 is a simplified diagram of a TE signal production circuit of the optical disk device illustrated in FIG. 1.

As shown in FIG. 5, the controller 8 also has a tracking error (TE) signal production circuit. The TE signal production circuit produces the TE signals from the electrical signals SA to SH corresponding to the regions A to H, respectively. More specifically, the TE signal production circuit is provided with summing amplifiers 821, 822, 823 and 824, a main TBAL adjustment circuit 825, a sub TBAL adjustment circuit 826, a main differential amplifier 827, a sub differential amplifier 828, and a combination differential amplifier 829.

The summing amplifier 821 sums the electrical signals SA and SB. The summing amplifier 822 sums the electrical signals SC and SD. The main TBAL adjustment circuit 825 multiplies the signal outputted from the summing amplifier 821 by a first TBAL coefficient, and multiplies the signal outputted from the summing amplifier 822 by a second TBAL coefficient. The output signal of the summing amplifier 821 by which the first TBAL coefficient has been multiplied is supplied to a non-inverting input terminal of the main differential amplifier 827, and the output signal of the summing amplifier 822 by which the second TBAL coefficient has been multiplied is supplied to an inverting input terminal of the main differential amplifier 827. The main differential amplifier 827 produces a main push-pull signal from the signals supplied to the non-inverting input terminal and inverting input terminal, and outputs the resulting signal to the non-inverting input terminal of the combination differential amplifier 829.

The summing amplifier 823 sums the electrical signals SE and SF. The summing amplifier 824 sums the electrical signals SG and SH. The sub TBAL adjustment circuit 826 multiplies the signal outputted from the summing amplifier 823 by a third TBAL coefficient, and multiplies the signal outputted from the summing amplifier 824 by a fourth TBAL coefficient. The output signal of the summing amplifier 823 by which the third TBAL coefficient has been multiplied is supplied to a non-inverting input terminal of the sub differential amplifier 828, and the output signal of the summing amplifier 824 by which the fourth TBAL coefficient has been multiplied is supplied to an inverting input terminal of the sub differential amplifier 828. The sub differential amplifier 828 produces a sub push-pull signal from the signals supplied to the non-inverting input terminal and inverting input terminal, and outputs the resulting signal to the non-inverting input terminal of the combination differential amplifier 829.

The combination differential amplifier 829 produces a TE signal from the main push-pull signal and the sub push-pull signal. The balance value of the TE signal (TBAL value), which is an index indicating the amplitude balance of the TE signal, is calculated by the controller 8 (see FIG. 1). The controller 8 controls the main TBAL adjustment circuit 825 and the sub TBAL adjustment circuit 826 to change the main TBAL adjustment value (e.g., the ratio of the second TBAL coefficient to the first TBAL coefficient) and the sub TBAL adjustment value (e.g., the ratio of the fourth TBAL coefficient to the third TBAL coefficient), and thereby adjusts the TBAL.

Next, processing to adjust the FBAL and the spherical aberration of the optical disk device 100 pertaining to this embodiment will be described through reference to FIGS. 6 to 15. As discussed above, this processing is executed at least prior to the reproduction of the optical disk 200, such as immediately after the optical disk 200 is inserted into the optical disk device 100. Before performing this processing to adjust the FBAL and the spherical aberration, TBAL adjustment processing is executed ahead of time, so the TBAL is already adjusted.

Figure 6:
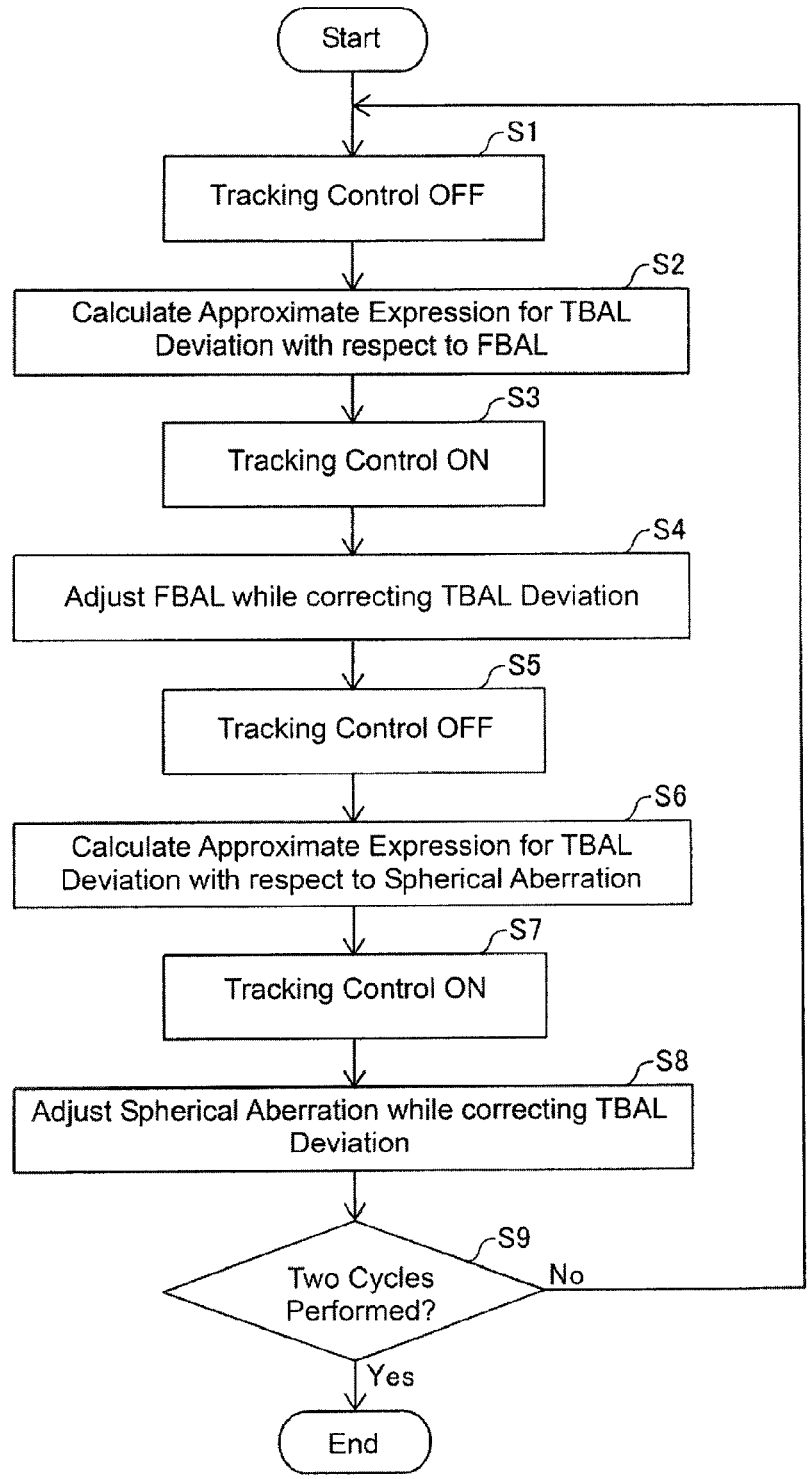
FIG. 6 is a flowchart illustrating processing for adjusting spherical aberration and a focus balance (FBAL) of the optical disk device illustrated in FIG. 1.

First, in step S1 in FIG. 6 the controller 8 halts the tracking servo control, and in step S2 calculates an approximate expression defining the relation of the amount of deviation of the tracking balance (TBAL) to a change in the focus balance (FBAL). Specifically, the controller 8 calculates the deviation in the TBAL with respect to the FBAL in a state in which the tracking servo control has been stopped.

Figure 7:
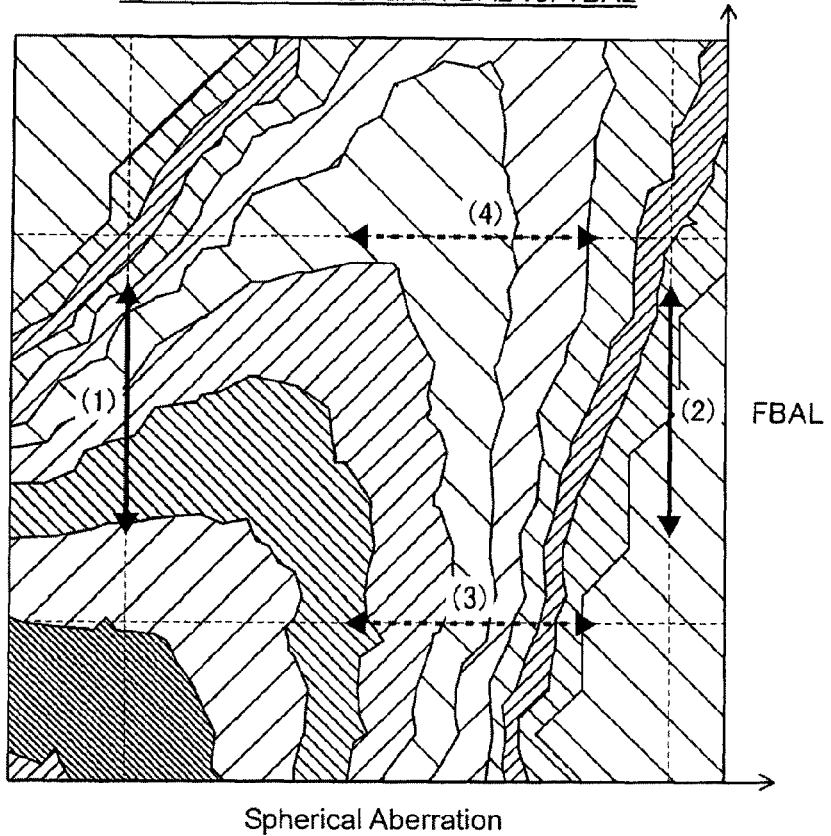
FIG. 7 is a diagram of the relation of the FBAL and a tracking balance (TBAL) to the spherical aberration with the optical disk device illustrated in FIG. 1.

The relation of the TBAL to the FBAL and the spherical aberration in the optical disk device 100 pertaining to this embodiment will now be described through reference to FIG. 7. The horizontal axis in FIG. 7 is the position of the collimator lens 17 used to adjust the spherical aberration, and the vertical axis is the FBAL value. The TBAL value is indicated by contour lines. First, when the FBAL value is varied within a specific range in a state in which the position of the collimator lens 17 is fixed, as indicated by the solid line arrows (1) and (2) in FIG. 7, there is a corresponding change in the TBAL value. Even though the range of change in the FBAL value is the same in the case of the solid line arrows (1) and (2), the proportion of change in the TBAL value is different. Specifically, the proportion of change in the TBAL value with respect to the change in the FBAL value varies with the value of the spherical aberration (e.g., the position of the collimator lens 17).

Also, when the position of the collimator lens 17 is varied within a specific range in a state in which the FBAL value is fixed, as indicated by the dotted line arrows (3) and (4), there is a corresponding change in the TBAL value. Even though the range of movement of the collimator lens 17 is the same in the case of the solid line arrows (3) and (4), the proportion of change in the TBAL value is different. Specifically, the proportion of change in the TBAL value with respect to the spherical aberration value (e.g., the position of the collimator lens 17) varies with the FBAL value. Thus, with the optical disk device 100 pertaining to this embodiment, the FBAL, the spherical aberration, and the TBAL are related to each other.

Figure 8:
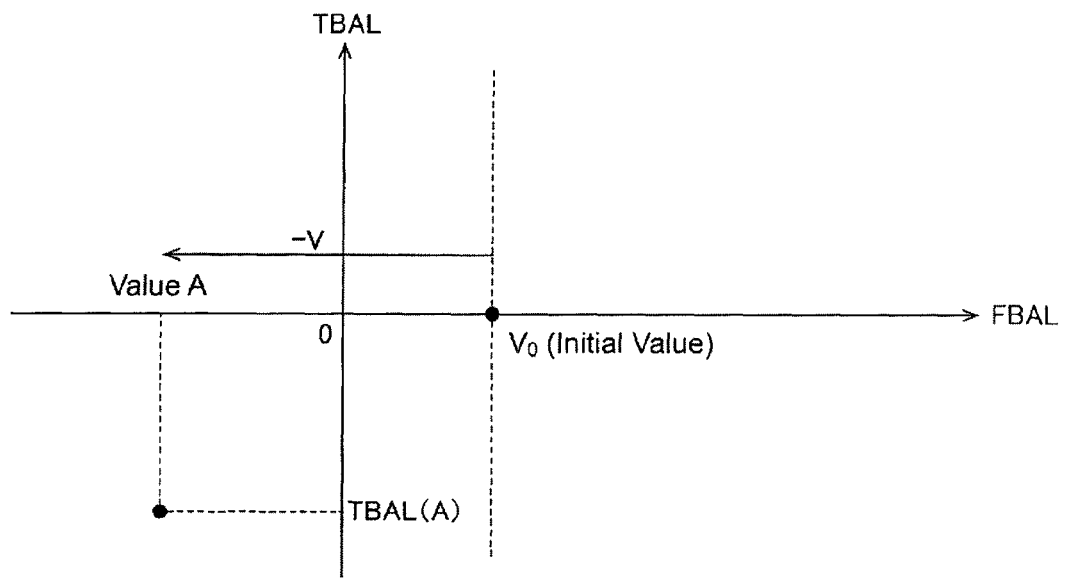
FIG. 8 is a graph of deviation in the TBAL when the FBAL of the optical disk device is a value A.
Figure 9:
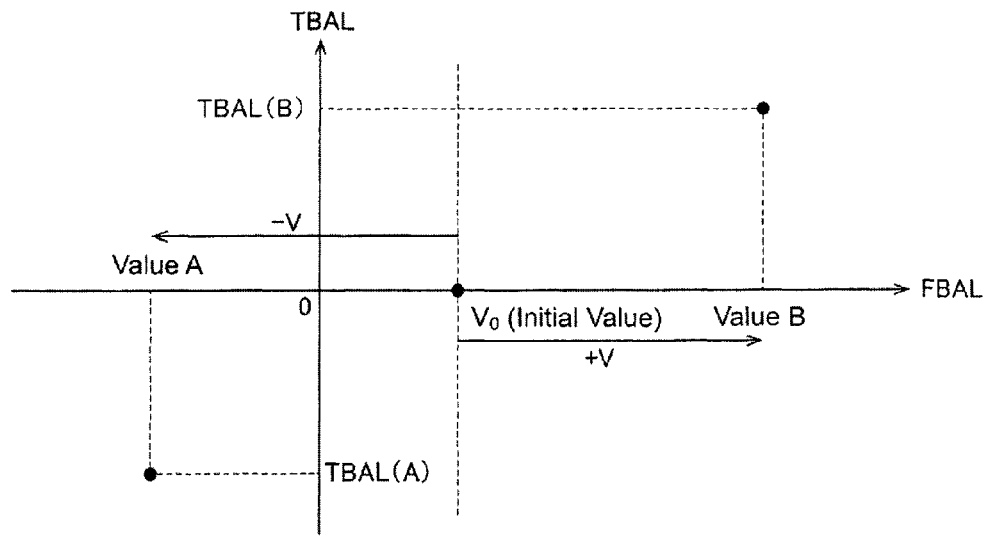
FIG. 9 is a graph of deviation in the TBAL when the FBAL of the optical disk device is a value B.

In step S2, as shown in FIG. 8, the controller 8 acquires the TBAL value (TBAL (A)) at which the tracking error (TE) signal is optimal (e.g., at which the TE signal is at its highest level), with the FBAL value set to a value A that deviates by a specific amount V in the negative direction from the initial value $V_0$ in a state in which the tracking servo control has been stopped. The initial value $V_0$ of the FBAL is the FBAL value at which the TE signal is optimal (e.g., at which the TE signal is at its highest level) at the adjusted TBAL value. A case in which the adjusted TBAL value is 0% is given as an example here. Next, as shown in FIG. 9, the controller 8 acquires the TBAL value (TBAL (B)) at which the TE signal is optimal, with the FBAL value set to a value B that deviates by the specific amount V in the positive direction from the initial value $V_0$ in a state in which the tracking servo control has been stopped. In acquiring the TBAL (A) and the TBAL (B), the position of the collimator lens 17 is fixed at the initial position $P_0$ (discussed below).

Figure 10:
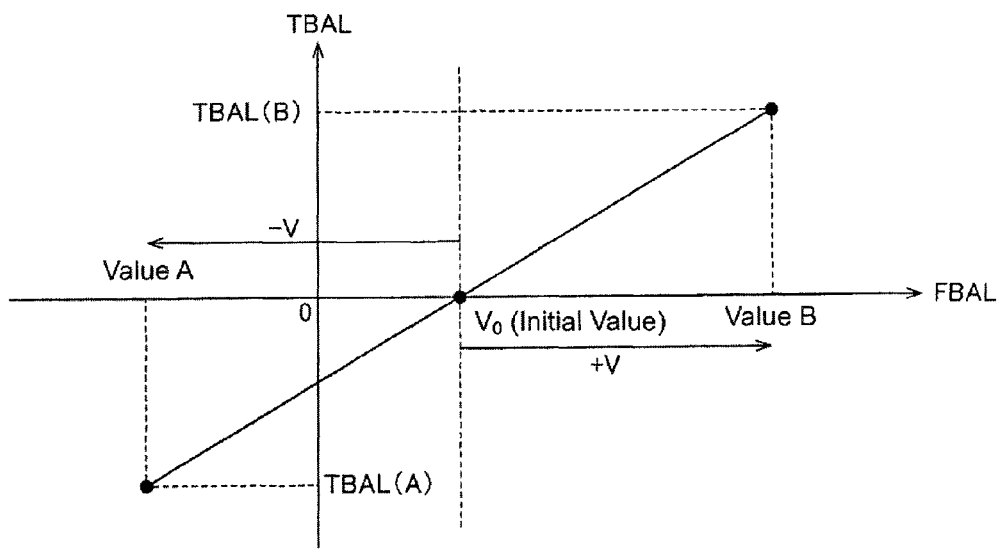
FIG. 10 is a graph of the relation of the amount of deviation in the TBAL to a change in the FBAL of the optical disk device.

After this, as shown in FIG. 10, the controller 8 calculates a linear approximate expression (1) that defines a straight line that passes through the TBAL (A) when the FBAL is the value A, and the TBAL (B) when the FBAL is the value B. The linear approximate expression (1) is an example of the "first approximate expression" of the present application.

$$Y_{TBAL} = aX_{FBAL} + b \qquad (1)$$

Here, $Y_{TBAL}$ is the TBAL value, $X_{FBAL}$ is the FBAL value, and a and b are each a constant.

The controller 8 can use the above linear approximate expression (1) to calculate the amount of deviation in the TBAL value with respect to a change in the FBAL value. The amount of deviation in the TBAL value is the amount of deviation with respect to the adjusted TBAL value (e.g., 0% in the example shown in FIGS. 8 to 10).

Figure 11:
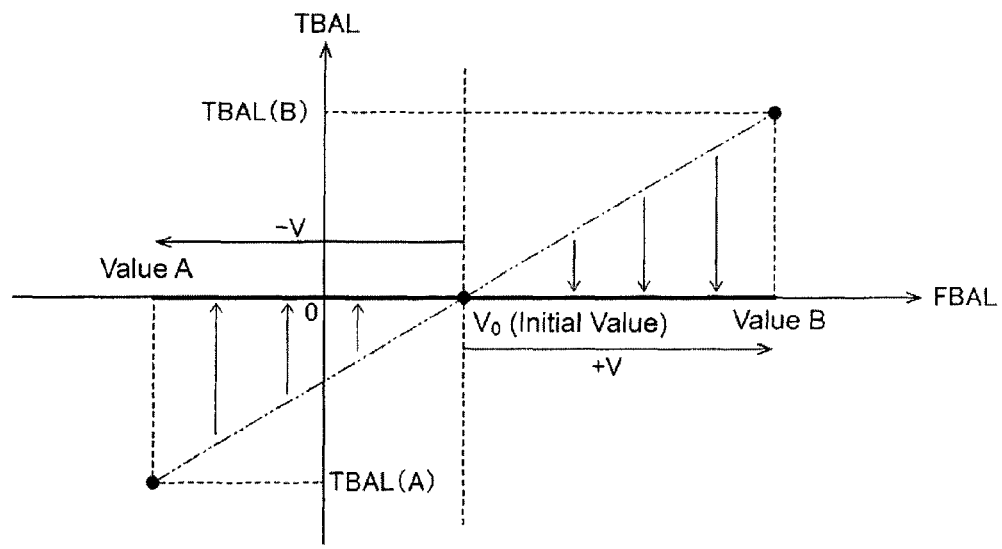
FIG. 11 is a graph of the state during adjustment of the FBAL of the optical disk device.

After this, in step S3 the controller 8 starts the tracking servo control, and in step S4 adjusts the FBAL while correcting deviation in the TBAL. Specifically, as shown in FIG. 11, the controller 8 adjusts the FBAL while correcting deviation in the TBAL attributable to a change in the FBAL in a state in which the tracking servo control is being performed. More specifically, the controller 8 varies the FBAL value and acquires the FBAL value at which the RF signal is optimal (e.g., at which the RF signal is at its highest level) while correcting deviation in the TBAL based on the above-mentioned linear approximate expression (1). In other words, the controller 8 varies the FBAL value and acquires the FBAL value at which the RF signal is optimal while correcting the TBAL such that there is no deviation from the adjusted TBAL value (e.g., 0% in the examples in FIGS. 8 to 11) based on the above-mentioned linear approximate expression (1). The controller 8 then adjusts the FBAL so as to optimize the RF signal. During adjustment of the FBAL, the position of the collimator lens 17 is fixed at the initial position $P_0$ (discussed below).

After this, the spherical aberration is adjusted (i.e., the position of the collimator lens 17 is adjusted). More specifically, in step S5 the controller 8 halts the tracking servo control that has been actuated during adjustment of the FBAL, and in step S6 calculates an approximate expression that defines the relation of the amount of deviation in the TBAL to a change in the spherical aberration (e.g., a change in the position of the collimator lens 17). Specifically, the controller 8 calculates the deviation in the TBAL with respect to the spherical aberration in a state in which the tracking servo control has been stopped.

Figure 12:
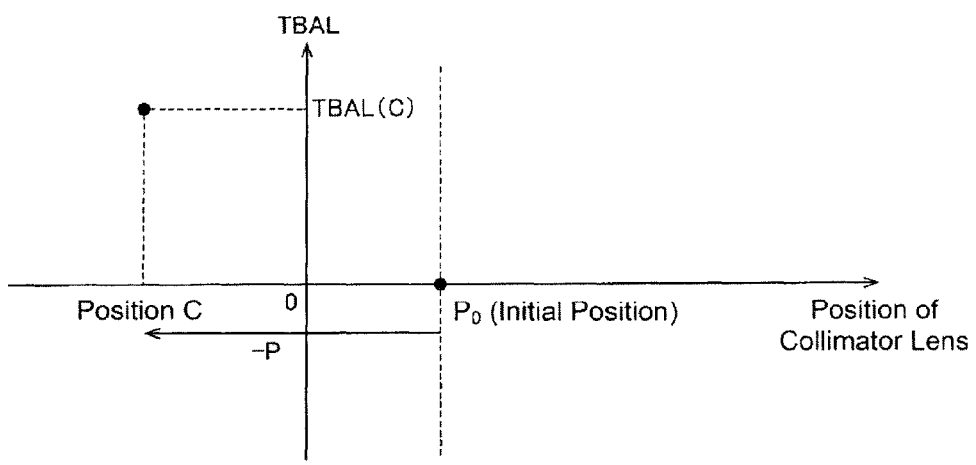
FIG. 12 is a graph of deviation in the TBAL when the position of a collimator lens in the optical disk device is a position C.
Figure 13:
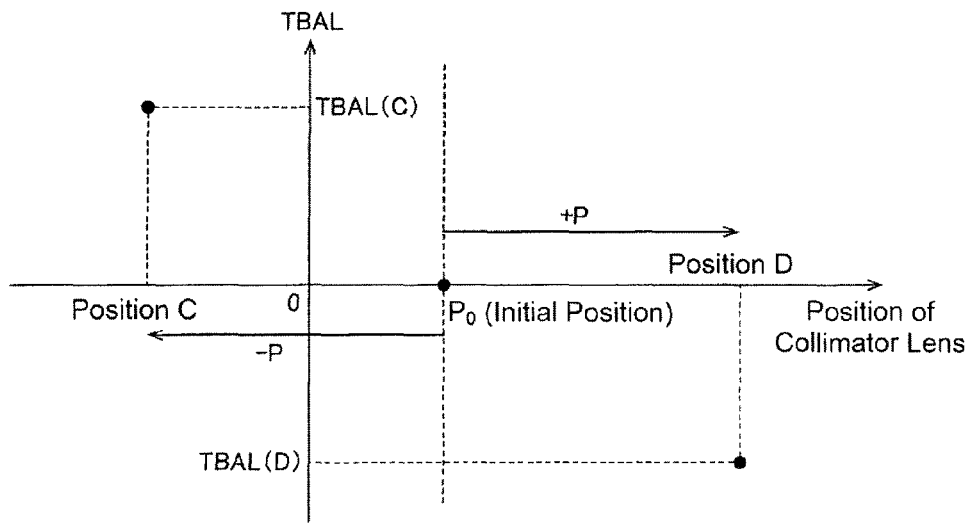
FIG. 13 is a graph of deviation in the TBAL when the position of the collimator lens in the optical disk device is a position D.

As shown in FIG. 12, the controller 8 here acquires the TBAL value (TBAL (C)) at which the tracking error (TE) signal is optimal (e.g., at which the TE signal is at its highest level), with the position of the collimator lens 17 set to a position C that deviates by a specific amount P in the negative direction from the initial position $P_0$ in a state in which the tracking servo control has been stopped. The initial position $P_0$ of the collimator lens 17 is the position of the collimator lens 17 at which the TE signal is optimal (e.g., at which the TE signal is at its highest level) at the adjusted TBAL value. Next, as shown in FIG. 13, the controller 8 acquires the TBAL value (TBAL (D)) at which the TE signal is optimal, with the position of the collimator lens 17 set to a position D that deviates by the specific amount P in the positive direction from the initial position $P_0$ in a state in which the tracking servo control has been stopped. In acquiring the TBAL (C) and the TBAL (D), the FBAL value is fixed at the value adjusted in the above-mentioned step S4.

Figure 14:
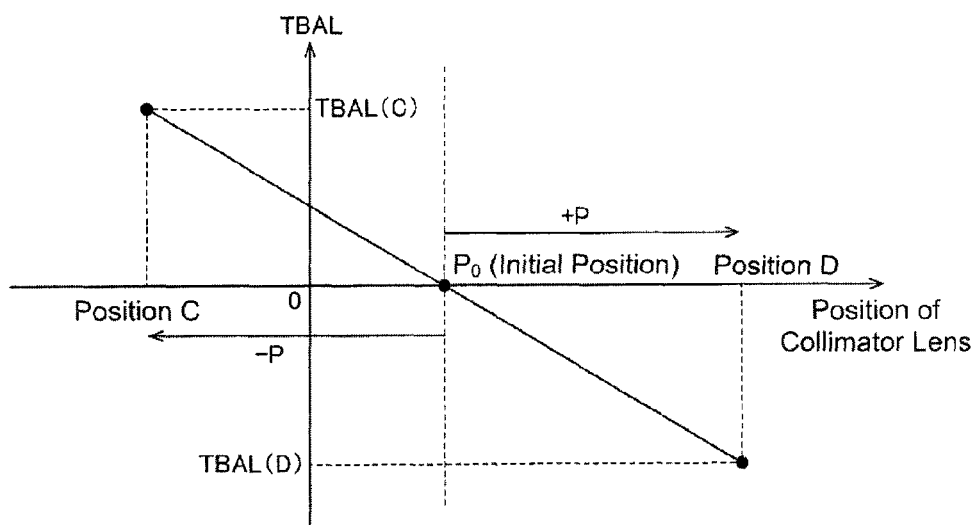
FIG. 14 is a graph of the relation of the amount of deviation in the TBAL to the position of the collimator lens in the optical disk device.

After this, as shown in FIG. 14, the controller 8 calculates a linear approximate expression (2) that defines a straight line that passes through the TBAL (C) when the position of the collimator lens 17 is the position C, and the TBAL (D) when the position of the collimator lens 17 is the position D. The linear approximate expression (2) is an example of the "second approximate expression" of the present application.

$$Y_{TBAL} = cX_{BEX} + d \qquad (2)$$

Here, $Y_{TBAL}$ is the TBAL value, $X_{BEX}$ is the position of the collimator lens 17, and c and d are each a constant.

The controller 8 can use the above linear approximate expression (2) to calculate the amount of deviation in the TBAL value with respect to a change in the spherical aberration (e.g., a change in the position of the collimator lens 17). The amount of deviation in the TBAL value is the amount of deviation with respect to the adjusted TBAL value (e.g., 0% in the example shown in FIGS. 12 to 14).

Figure 15:
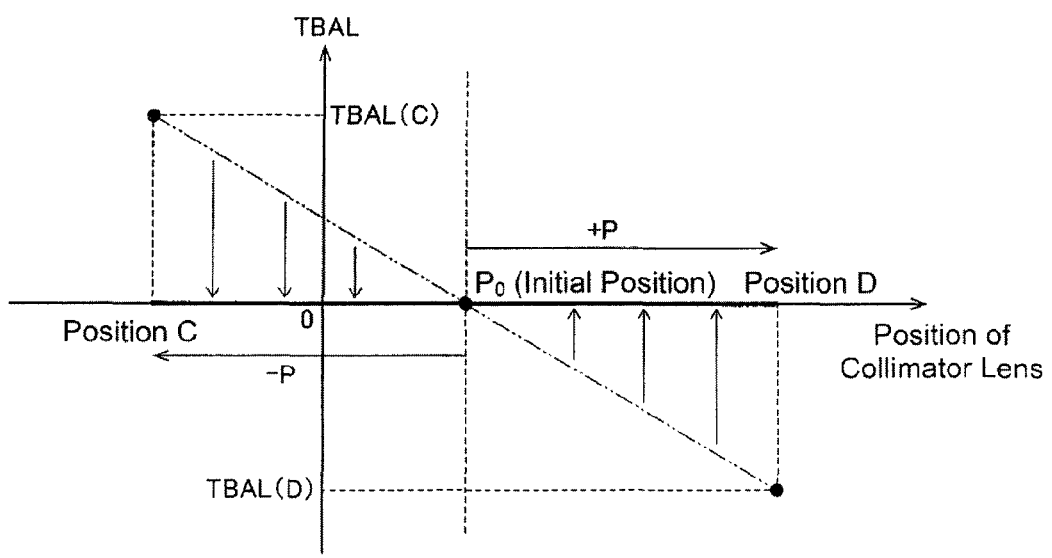
FIG. 15 is a graph of the state during adjustment of the spherical aberration in the optical disk device.

After this, in step S7 the controller 8 starts the tracking servo control, and in step S8 adjusts the spherical aberration (e.g., the position of the collimator lens 17) while correcting deviation in the TBAL. Specifically, as shown in FIG. 15, the controller 8 adjusts the position of the collimator lens 17 while correcting deviation in the TBAL attributable to a change in the position of the collimator lens 17 in a state in which the tracking servo control is being performed. More specifically, the controller 8 varies the position of the collimator lens 17 and acquires the position of the collimator lens 17 at which the RF signal is optimal (e.g., at which the RF signal is at its highest level) while correcting the TBAL such that there is no deviation from the adjusted TBAL value (e.g., 0% in the examples in FIGS. 12 to 15) based on the above-mentioned linear approximate expression (2). The controller 8 then adjusts the spherical aberration (e.g., the position of the collimator lens 17) so as to optimize the RF signal. During adjustment of the spherical aberration, the FBAL value is fixed at the value adjusted in the above-mentioned step S4.

In step S9 the controller 8 then determines whether or not the operation from steps S1 to S8 have been performed for two cycles, and if they have not been performed for two cycles, the flow returns to the operation of step S1 and the operation of steps S1 to S8 is performed again. The controller 8 performs the second cycle just like the first. In the second cycle, however, the controller 8 performs the operations of steps S1 to S4 related to the adjustment of the FBAL in the second cycle in a state in which the position of the collimator lens 17 is fixed at the position adjusted in step S8. Also, the controller 8 performs the operation of steps S5 to S8 related to the adjustment of the spherical aberration (e.g., the adjustment of the position of the collimator lens 17) in the second cycle in a state in which the FBAL value is fixed at the value adjusted in step S4 in the second cycle.

In the illustrated embodiment, the optical disk device 100 includes the optical pickup 1 and the controller 8. The optical pickup 1 emits light on the optical disk 200 and detects return light from the optical disk 200. The controller 8 performs the focus servo control (e.g., the focus control) based on the focus error signal corresponding to the return light detected by the optical pickup 1 during reproduction. The controller 8 performs the tracking servo control (e.g., the tracking control) based on the tracking error signal corresponding to the return light detected by the optical pickup 1. The controller 8 finds the relation of the amount of deviation in the tracking balance (TBAL) of the tracking error signal to the change in focus balance (FBAL) of the focus error signal in a state in which the tracking servo control has stopped prior to reproduction, and, based on this relation, corrects deviation in the TBAL attributable to a change in the FBAL when the FBAL is adjusted.

In this embodiment, as discussed above, the controller 8 is configured so as to find the relation of the amount of deviation in the tracking balance (TBAL) of the tracking error signal to a change in the focus balance (FBAL) of the focus error signal in a state in which tracking servo control has been stopped prior to reproduction, and also to correct, based on this relation, deviation in the TBAL attributable to a change in the FBAL in the adjustment of the FBAL. Consequently, deviation in the TBAL can be easily corrected based on the relation of the amount of deviation in the TBAL to a change in the FBAL prior to reproduction. Thus, the FBAL can be easily adjusted while suppressing deviation in the TBAL. This means that the tracking servo control can be performed in a state in which there is less deviation of the TBAL during reproduction, so even if the TBAL should fluctuate due to a change in the FBAL, the tracking servo control can be kept from becoming unstable during reproduction.

Also, in this embodiment, the controller 8 is configured so as to find the relation of the amount of deviation in the TBAL to a change in the FBAL in a state in which the tracking servo control has been stopped prior to reproduction, and also to correct, based on this relation, deviation in the TBAL attributable to a change in the FBAL in the adjustment of the FBAL. Furthermore, the controller 8 finds the relation of the amount of deviation in the TBAL to a change in the spherical aberration of the optical pickup 1 in a state in which the tracking servo control has been stopped, and also corrects, based on this relation, deviation in the TBAL attributable to a change in the spherical aberration while the spherical aberration is adjusted. Consequently, when the FBAL and the spherical aberration are both adjusted, deviation in the TBAL can be easily corrected based on the relation of the amount of deviation in the TBAL to a change in the FBAL and to a change in the spherical aberration, so both the FBAL and the spherical aberration can be easily adjusted while suppressing deviation in the TBAL.

Also, in this embodiment, the controller 8 is configured so as to calculate the linear or first-order approximate expression (1) (e.g., the first approximate expression) as the relation of the amount of deviation in the TBAL to a change in the FBAL in a state in which the tracking servo control has been stopped prior to reproduction, and also to calculate the linear or first-order approximate expression (2) (e.g., the second approximate expression) as the relation of the amount of deviation in the TBAL to a change in the spherical aberration in a state in which the tracking servo control has been stopped. Consequently, when the FBAL and the spherical aberration are both adjusted, deviation in the TBAL can be accurately corrected based on the first approximate expression (1) and the second approximate expression (2), so deviation in the TBAL can be more reliably suppressed in the adjustment of both the FBAL and the spherical aberration.

In this embodiment, the first approximate expression (1) and the second approximate expression (2) are calculated. The first approximate expression (1) and the second approximate expression (2) are both linear approximate expressions. With this configuration, the controller 8 can easily calculate the first approximate expression (1) and the second approximate expression (2), so deviation in the TBAL can be easily and more reliably suppressed in the adjustment of both the FBAL and the spherical aberration.

In this embodiment, the first approximate expression (1) and the second approximate expression (2) are linear approximate expressions. Furthermore, the first approximate expression (1) is $Y_{TBAL}=aX_{FBAL}+b$, and the second approximate expression (2) is $Y_{TBAL}=cX_{BEX}+d$. In the first approximate expression (1) and the second approximate expression (2), $Y_{TBAL}$ is the tracking balance value, $X_{FBAL}$ is the focus balance value, $X_{BEX}$ is the value corresponding to the spherical aberration, and a, b, c, and d are each a constant. With this configuration, deviation in the TBAL can be easily calculated from the first approximate expression (1) and the second approximate expression (2).

Also, in this embodiment, deviation in the TBAL attributable to a change in the FBAL and the spherical aberration is corrected. Furthermore, the controller 8 is configured so as to adjust the FBAL while correcting deviation in the TBAL in a state in which the tracking servo control is being performed prior to reproduction, and then to adjust the spherical aberration while correcting deviation in the TBAL in a state in which the tracking servo control is being performed. Consequently, when the amount of deviation in the TBAL during adjustment of the FBAL has a tendency to become larger than during adjustment of the spherical aberration, the adjustment of the FBAL, in which deviation in the TBAL is more apt to occur, can be performed prior to the adjustment of the spherical aberration, allowing the adjustment of both the FBAL and the spherical aberration to be carried out more accurately.

Also, in this embodiment, the spherical aberration is adjusted after the FBAL has been adjusted. Furthermore, the controller 8 is configured so as to repeat a plurality of (e.g., two) cycles of processing in which it adjusts the FBAL while correcting deviation in the TBAL in a state in which the tracking servo control is being performed prior to reproduction, after which it adjusts the spherical aberration while correcting deviation in the TBAL in a state in which tracking servo control is being performed. Consequently, the accuracy of adjustment of both the FBAL and the spherical aberration can be increased by repeating a plurality of (e.g., two) cycles of the adjustment of both the FBAL and the spherical aberration.

Also, in this embodiment, deviation in the TBAL attributable to a change in the FBAL and the spherical aberration is corrected. Furthermore, the controller 8 is configured so as to adjust the TBAL prior to reproduction, adjust the FBAL while correcting deviation with respect to the adjusted TBAL, and also adjust the spherical aberration while correcting deviation with respect to the adjusted TBAL. Consequently, the FBAL and the spherical aberration can both be adjusted while suppressing deviation of the TBAL from the adjusted state of the TBAL, so the optical disk 200 can be reproduced in a state in which the TBAL, the FBAL, and the spherical aberration are all accurately adjusted. As a result, the tracking servo control and the focus servo control can be performed more stably during reproduction.

In the illustrated embodiment, the optical disk device adjusting method includes the steps of performing the focus servo control (e.g., the focus control) based on the focus error signal corresponding to the return light from the optical disk 200 detected by the optical pickup 1, performing the tracking servo control (e.g., the tracking control) based on the tracking error signal corresponding to the return light detected by the optical pickup 1, and finding the relation of the amount of deviation in the tracking balance (TBAL) of the tracking error signal to the change in focus balance (FBAL) of the focus error signal in a state in which the tracking servo control has been stopped prior to reproduction, and also correcting, based on this relation, deviation in the TBAL attributable to a change in the FBAL when the FBAL is adjusted.

With this optical disk device adjusting method, as discussed above, a step is provided for finding the relation of the amount of deviation in the TBAL of the tracking error signal corresponding to a change in the FBAL of the focus error signal in a state in which the tracking servo control has been stopped prior to reproduction, and correcting, based on this relation, the deviation in TBAL attributable to the change in the FBAL when the FBAL is adjusted. Therefore, any deviation in the TBAL can be easily corrected based on the relation of the amount of deviation in the TBAL to the change in the FBAL prior to reproduction, so the FBAL can be easily adjusted while suppressing deviation in the TBAL. Consequently, the tracking servo control can be carried out in a state of less deviation in the TBAL, so the tracking servo control can be kept from becoming unstable during reproduction even if there is fluctuation in the TBAL attributable to a change in the FBAL.

With the optical disk device 100 and the optical disk device adjusting method, as discussed above, the tracking servo control can be kept from becoming unstable during reproduction even if there is fluctuation in the TBAL attributable to a change in the FBAL.

The embodiment disclosed herein is only an example in all respects, and should not be construed as being limiting in nature. The scope of the invention is defined by the appended claims, and not by the above description of the embodiment, and includes all modifications within equivalent meanings and ranges as in the appended claims.

For example, in the illustrated embodiment, an example is given in which the present application is applied to an optical disk device corresponding to CD, DVD, and BD. However, the present application is not limited to this. The present application can be applied to an optical disk device corresponding to either CD, DVD, or BD, or can be applied to an optical disk device other than CD, DVD, or BD.

In the illustrated embodiment, an example is given in which the FBAL and the spherical aberration are adjusted while the tracking servo control is performed. However, the present application is not limited to this. With the present application, the FBAL and the spherical aberration can be adjusted in a state in which the tracking servo control has been stopped.

In the illustrated embodiment, an example is given in which the tracking balance (TBAL) values corresponding to two mutually different focus balance (FBAL) values are acquired in the adjustment of the FBAL, and the linear approximate expression that defines the relation of the amount of deviation in the TBAL to a change in the FBAL is defined based on these two TBAL values. However, the present application is not limited to this. With the present application, the TBAL values corresponding to three or more mutually different FBAL values can be acquired, and a linear approximate expression that defines the relation of the amount of deviation in the TBAL to a change in the FBAL can be calculated based on these three or more TBAL values. Also, the approximate expression that defines the relation of the amount of deviation in the TBAL to a change in the FBAL is not limited to being a linear approximate expression, and can instead be a quadratic approximate expression, or a cubic or higher approximate expression.

In the illustrated embodiment, an example is given in which deviation in the TBAL is corrected based on an approximate expression that defines the relation of the amount of deviation in the TBAL to a change in the FBAL in the adjustment of the FBAL. However, the present application is not limited to this. With the present application, deviation in the TBAL can be corrected based on a graph or table that defines the relation of the amount of deviation in the TBAL to a change in the FBAL, instead of calculating the approximate expression.

Also, the adjustment of the spherical aberration is similar to the above-mentioned case of the FBAL in that the TBAL values corresponding to three or more mutually different positions of the collimator lens can be acquired, and an approximate expression (not just a linear approximate expression, but also including a quadratic or higher approximate expression) that defines the relation of the amount of deviation in the TBAL to a change in the position of the collimator lens can be calculated based on these three or more TBAL values. Also, in the adjustment of the spherical aberration, using an approximate expression is not the only option, and deviation in the TBAL can instead be corrected based on a graph or table that defines the relation of the amount of deviation in the TBAL to a change in the position of the collimator lens.

Also, in the illustrated embodiment, an example is given in which the spherical aberration is adjusted after the FBAL is adjusted. However, the present application is not limited to this. With the present application, the FBAL can instead be adjusted after the spherical aberration is adjusted.

Also, in the illustrated embodiment, an example is given in which the adjustment of the FBAL and the adjustment of the spherical aberration are performed for two cycles. However, the present application is not limited to this. With the present application, the adjustment of the FBAL and the adjustment of the spherical aberration can instead be performed for just one cycle, or for three or more cycles.

Also, in the illustrated embodiment, for the sake of convenience, a flow drive type of flowchart in which the processing done by the controller of the present application is carried out sequentially along the processing flow is used in the description. However, the present application is not limited to this.

With the present application, the processing operation of the controller can entail an event drive type of processing in which the processing is executed in event units. In this case, the processing can be a completely event drive type, or can be a combination of event drive type and the flow drive type.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An optical disk device comprising:
   an optical pickup configured to emit light on an optical disk, and detect return light from the optical disk; and
   a controller configured to perform a focus control based on a focus error signal corresponding to the return light detected by the optical pickup, and perform a tracking control based on a tracking error signal corresponding to the return light detected by the optical pickup,
   the controller being further configured to find a relation of an amount of deviation in a tracking balance of the tracking error signal relative to a change in a focus balance of the focus error signal while the tracking control is stopped prior to reproduction of the optical disk,
   the controller being further configured to correct the deviation in the tracking balance attributable to the change in the focus balance based on the relation while the focus balance is adjusted.

2. The optical disk device according to claim 1, wherein
   the controller is further configured to find a relation of an amount of deviation in the tracking balance relative to a change in a spherical aberration of the optical pickup while the tracking control is stopped, the controller being further configured to correct the deviation in the tracking balance attributable to the change in the spherical aberration based on the relation while the spherical aberration is adjusted.

3. The optical disk device according to claim 2, wherein
   the controller is further configured to calculate a first approximate expression as the relation of the amount of deviation in the tracking balance relative to the change in the focus balance while the tracking control is stopped prior to the reproduction of the optical disk, and
   the controller is further configured to calculate a second approximate expression as the relation of the amount of deviation in the tracking balance relative to the change in the spherical aberration while the tracking control is stopped.

4. The optical disk device according to claim 3, wherein
   the first approximate expression and the second approximate expression are both linear approximate expressions.

5. The optical disk device according to claim 4, wherein
   the first approximate expression is $Y_{TBAL}=aX_{FBAL}+b$, and the second approximate expression is $Y_{TBAL}=cX_{BEX}+d$,
   where, in the first approximate expression and the second approximate expression, $Y_{TBAL}$ is a tracking balance value of the tracking balance, $X_{FBAL}$ is a focus balance value of the focus balance, $X_{BEX}$ is a value corresponding to the spherical aberration, and a, b, c, and d are constant values.

6. The optical disk device according to claim 2, wherein
   the controller is further configured to adjust the focus balance while correcting the deviation in the tracking balance while the tracking control is performed prior to the reproduction of the optical disk, and
   the controller is further configured to adjust the spherical aberration while correcting the deviation in the tracking balance after the controller adjusts the focus balance while the tracking control is performed.

7. The optical disk device according to claim 6, wherein
   the controller is further configured to repeat a plurality of cycles of processing in which the controller adjusts the focus balance while correcting the deviation in the tracking balance while the tracking control is performed prior to the reproduction of the optical disk, and the controller adjusts the spherical aberration while correcting the deviation in the tracking balance after the controller adjust the focus balance while the tracking control is performed.

8. The optical disk device according to claim 2, wherein
   the controller is further configured to adjust the tracking balance prior to the reproduction of the optical disk, adjust the focus balance while correcting the deviation in the tracking balance with respect to the adjusted tracking balance, and adjust the spherical aberration while correcting the deviation in the tracking balance with respect to the adjusted tracking balance.

9. The optical disk device according to claim 2, wherein
   the controller is further configured to adjust the focus balance while the spherical aberration is fixed, and
   the controller is further configured to adjust the spherical aberration while the focus balance is fixed at the adjusted focus balance.

10. The optical disk device according to claim 3, wherein
    the controller is further configured to start the tracking control in response to calculating the first approximate expression, and
    the controller is further configured to stop the tracking control in response to adjusting the focus balance.

11. The optical disk device according to claim 10, wherein
    the controller is further configured to start the tracking control in response to calculating the second approximate expression.

12. An optical disk device adjusting method comprising
    performing a focus control based on a focus error signal corresponding to return light from an optical disk detected by an optical pickup of an optical disk device;
    performing a tracking control based on a tracking error signal corresponding to the return light detected by the optical pickup of the optical disk device; and
    finding a relation of an amount of deviation in a tracking balance of the tracking error signal relative to a change in a focus balance of the focus error signal while the tracking control is stopped prior to reproduction of the optical disk, and correcting the deviation in the tracking balance attributable to the change in the focus balance based on the relation while the focus balance is adjusted.

* * * * *